(12) United States Patent
Millner

(10) Patent No.: US 8,968,441 B2
(45) Date of Patent: *Mar. 3, 2015

(54) METHOD AND SYSTEM FOR PRODUCING PIG IRON OR FLUID STEEL PRE-PRODUCTS

(75) Inventor: Robert Millner, Loosdorf (AT)

(73) Assignee: Siemens Vai Metals Technologies GmbH (AT)

( * ) Notice: Subject to any disclaimer, the term of this patent is extended or adjusted under 35 U.S.C. 154(b) by 86 days.

This patent is subject to a terminal disclaimer.

(21) Appl. No.: 13/147,307

(22) PCT Filed: Jan. 14, 2010

(86) PCT No.: PCT/EP2010/050374
§ 371 (c)(1),
(2), (4) Date: Sep. 21, 2011

(87) PCT Pub. No.: WO2010/086229
PCT Pub. Date: Aug. 5, 2010

(65) Prior Publication Data
US 2012/0036961 A1    Feb. 16, 2012

(30) Foreign Application Priority Data
Jan. 30, 2009   (AT) .................................. A 164/2009

(51) Int. Cl.
*C21B 5/06*   (2006.01)
*C21B 7/16*   (2006.01)
(Continued)

(52) U.S. Cl.
CPC .............. *C21B 5/003* (2013.01); *C21B 7/163* (2013.01); *C21B 2100/02* (2013.01); *C21B 2100/04* (2013.01)
USPC ............................. 75/443; 266/156; 266/140

(58) Field of Classification Search
CPC ............ C21B 2100/02; C21B 2100/04; C21B 13/002; C21B 5/06; C21B 13/0073; C21C 2100/06
USPC .......................................................... 75/443
See application file for complete search history.

(56) References Cited

U.S. PATENT DOCUMENTS

| 3,019,100 A | 1/1962 | Robson ............................ 75/26 |
| RE31,572 E * | 5/1984 | Coulter et al. .................... 222/1 |

(Continued)

FOREIGN PATENT DOCUMENTS

| AT | 406380 B | 4/2000 | ............. C21B 13/14 |
| AT | 406485 B | 5/2000 | ............. C21B 13/14 |

(Continued)

OTHER PUBLICATIONS

International PCT Search Report, PCT/EP2010/050374, 15 pages, May 13, 2011.

(Continued)

*Primary Examiner* — Roy King
*Assistant Examiner* — Xiaowei Su
(74) *Attorney, Agent, or Firm* — Ostrolenk Faber LLP

(57) ABSTRACT

A method and a plant for the production of pig iron or liquid steel semi-finished products are shown, metal oxide-containing batch materials and, if appropriate, aggregates being at least partially reduced in a reduction zone by a reduction gas, subsequently being introduced into a smelting zone and being smelted along with the supply of carbon carriers and oxygen-containing gas and along with the formation of the reduction gas. The reduction gas formed in the smelting zone is supplied to the reduction zone, reacted there and drawn off as export gas, $CO_2$ is separated from the export gas, and a product gas is formed which is utilized for the introduction of pulverulent carbon carriers into the smelting zone.

8 Claims, 2 Drawing Sheets

(51) Int. Cl.
*C21B 7/00* (2006.01)
*C21B 5/00* (2006.01)

(56) References Cited

U.S. PATENT DOCUMENTS

| | | | |
|---|---|---|---|
| 4,579,588 A | 4/1986 | van Langen | 75/35 |
| 4,883,390 A * | 11/1989 | Reintjes et al. | 406/24 |
| 5,198,019 A | 3/1993 | Dry et al. | 75/500 |
| 5,340,378 A | 8/1994 | Huestis | 75/414 |
| 5,447,551 A | 9/1995 | Huestis et al. | 75/414 |
| 5,961,690 A | 10/1999 | Kepplinger et al. | |
| 6,045,602 A | 4/2000 | Shah et al. | 75/466 |
| 6,214,084 B1 * | 4/2001 | Saxena et al. | 75/453 |
| 6,214,085 B1 * | 4/2001 | Calderon et al. | 75/486 |
| 6,241,801 B1 | 6/2001 | Kepplinger | 75/414 |
| 6,251,162 B1 | 6/2001 | Eichberger et al. | 75/492 |
| 6,478,841 B1 | 11/2002 | Faccone et al. | 75/10.63 |
| 8,317,898 B2 | 11/2012 | Hauzenberger et al. | |
| 8,419,825 B2 * | 4/2013 | Burgler et al. | 75/492 |
| 2010/0024599 A1 | 2/2010 | Hauzenberger et al. | 75/380 |
| 2010/0043599 A1 | 2/2010 | Hauzenberger et al. | 75/573 |
| 2010/0050812 A1 * | 3/2010 | Van Heeringen et al. | 75/392 |
| 2011/0120266 A1 | 5/2011 | Bürgler et al. | 75/433 |
| 2011/0138965 A1 | 6/2011 | Boehm et al. | 75/505 |
| 2012/0020868 A1 * | 1/2012 | Millner et al. | 423/437.1 |
| 2012/0036961 A1 | 2/2012 | Millner | 75/443 |

FOREIGN PATENT DOCUMENTS

| | | | |
|---|---|---|---|
| CN | 1045127 A | 9/1990 | C21B 11/00 |
| DE | 102004036767 A1 | 3/2005 | C21B 5/06 |
| DE | 102006048600 A1 | 4/2008 | C21B 13/00 |
| DE | 102006048601 A1 | 4/2008 | C21B 13/00 |
| EP | 0488429 A2 | 6/1992 | C21B 13/14 |
| EP | 0997693 A2 | 5/2000 | F25J 3/04 |
| JP | 2007009069 A | 1/2007 | C01B 3/02 |
| RU | 2125613 | 1/1999 | |
| UA | 37264 C2 | 5/2001 | |
| UA | 41414 C2 | 9/2001 | |
| UA | 62929 C2 | 1/2004 | |
| UA | 79476 | 6/2007 | |
| WO | 2006/075977 A1 | 7/2006 | C21B 13/14 |
| WO | WO 2006087803 A1 * | 8/2006 | |
| WO | 2007/133050 A1 | 11/2007 | C21B 11/00 |
| WO | WO 2008046504 | 4/2008 | |
| WO | 2009/146982 A1 | 12/2009 | C21B 13/14 |
| WO | 2010/006905 A1 | 1/2010 | C21B 13/00 |
| WO | 2010/086229 A1 | 8/2010 | C21B 13/00 |
| WO | 2010/094566 A1 | 8/2010 | C21B 13/00 |

OTHER PUBLICATIONS

International PCT Search Report, PCT/EP2010/050310, 14 pages, May 12, 2010.
Notice of Allowance issued in corresponding Russian Application No. 2011135984/02 dated Dec. 9, 2013 (with English translation).
I.F. Kurunow, "Sostojanie i perspektiwi besdomennoj metallurgij", pp. 117-120, 2000 (with English translation).

* cited by examiner

METHOD AND SYSTEM FOR PRODUCING PIG IRON OR FLUID STEEL PRE-PRODUCTS

CROSS-REFERENCE TO RELATED APPLICATIONS

This application is a U.S. National Stage Application of International Application No. PCT/EP2010/050374 filed Jan. 14, 2010, which designates the United States of America, and claims priority to Austrian Application No. A164/2009 filed Jan. 30, 2009 the contents of which are hereby incorporated by reference in their entirety.

TECHNICAL FIELD

The invention relates to a method and a plant for the production of pig iron or liquid steel semi-finished products, metal-containing, in particular iron oxide-containing, batch materials and, if appropriate, aggregates being at least partially reduced in a reduction zone by means of a reduction gas, subsequently being introduced into a smelting zone and being smelted along with the supply of carbon carriers, in particular coke and/or coal, and oxygen-containing gas and along with the formation of the reduction gas, the formed reduction gas being supplied to the reduction zone and reacted there and being drawn off, if appropriate after purification, as export gas.

BACKGROUND

It is known from the prior art that ultrafinely particulate materials, such as, for example, carbon carriers, can be introduced into smelting assemblies by injection by means of injector gases. In this way, for example, pulverulent coals can be introduced, for example, into a blast furnace or else into a melt-down gasifier by means of an injector gas and an injector. The disadvantage of this is that separate injector gases, such as nitrogen, air or natural gas, have to be used, which increase the inert gas volume in the process, particularly in the case of additional internal gas recirculation, or entail high operating costs (for natural gas, power).

SUMMARY

According to various embodiments, a method and a plant can be made available which avoid such disadvantages during the introduction of ultrafinely particulate carbon carriers.

According to an embodiment, in a method for the production of pig iron or liquid steel semi-finished products, metal-containing, in particular iron oxide-containing, batch materials and, if appropriate, aggregates are at least partially reduced in a reduction zone by means of a reduction gas, subsequently being introduced into a smelting zone and being smelted along with the supply of lumpy carbon carriers, in particular coke and/or coal, and oxygen-containing gas and along with the formation of the reduction gas, the formed reduction gas being supplied to the reduction zone and reacted there and being drawn off, if appropriate after purification, as export gas, wherein at least part of the export gas is treated in a $CO_2$ separation device, along with the separation of $CO_2$ and the formation of a product gas, and is utilized for the introduction, in particular injection, of pulverulent carbon carriers, if appropriate together with a conveying gas, into the smelting zone.

According to a further embodiment, the product gas can be combined in a mixing chamber with the pulverulent carbon carriers, if appropriate together with a conveying gas, in particular nitrogen, and is then introduced into the smelting zone. According to a further embodiment, the introduction of the product gas and of the pulverulent carbon carriers, if appropriate together with a conveying gas, into the smelting zone may take place together with an oxygen-rich gas. According to a further embodiment, the product gas, the pulverulent carbon carriers, if appropriate the conveying gas, and the oxygen-rich gas can be injected together first into a tuyere or into an oxygen nozzle and then into the smelting zone. According to a further embodiment, the export gas can be compressed and/or cooled before treatment in the $CO_2$ separation device. According to a further embodiment, the $CO_2$-rich gas separated in the $CO_2$ separation device can be discharged as tail gas and can be intermediately stored, in particular, together with export gas from the reduction zone. According to a further embodiment, the $CO_2$-rich gas separated in the $CO_2$ separation device, as tail gas, and/or export gas from the reduction zone can be at least partially burnt in a heating device for the purpose of heating the product gas. According to a further embodiment, the heated product gas can be introduced into the reduction zone and/or the smelting zone. According to a further embodiment, the reduction gas drawn off from the reduction zone can be subjected to a dry dedusting and/or wet purification.

According to another embodiment, a plant for the production of pig iron or liquid steel semi-finished products, with a reduction assembly, in which metal-containing, in particular iron oxide-containing, batch materials and, if appropriate, aggregates can be at least partially reduced by means of a reduction gas, comprises a smelting assembly, into which the at least partially reduced batch materials or the aggregates can be introduced and smelted along with the supply of carbon carriers, in particular coke and/or coal, and oxygen-containing gas and along with the formation of the reduction gas, the formed reduction gas being capable of being supplied to the reduction assembly, reacted there and drawn off, if appropriate after purification, as export gas, wherein a $CO_2$ separation device for separating $CO_2$ from the export gas and for forming a product gas is provided, the product gas being connected via a product gas line to at least one introduction device for the introduction, in particular injection, of pulverulent carbon carriers into the smelting assembly.

According to a further embodiment of the plant, the introduction device may have at least one mixing chamber for mixing the product gas with pulverulent carbon carriers and, if appropriate, conveying gas, the mixing chamber being connected to the product gas line and to a conveying line for the inward conveyance of the pulverulent carbon carriers. According to a further embodiment of the plant, the introduction device may have an introduction line which connects the mixing chamber to at least one nozzle. According to a further embodiment of the plant, the introduction device may have a supply line for the introduction of oxygen-containing gas. According to a further embodiment of the plant, the supply line and the introduction line can be merged in the nozzle. According to a further embodiment of the plant, the nozzle can be a tuyere of a blast furnace or an oxygen nozzle of a smelting assembly. According to a further embodiment of the plant, the reduction assembly can be designed as the shaft of a blast furnace or as a reduction shaft or as a fluidized bed assembly or as a group of series-connected fluidized bed assemblies, and the smelting assembly is designed as the lower part of a blast furnace or as a melt-down gasifier. According to a further embodiment of the plant, a purification device, in particular dry purification and/or wet purification, can be provided in a top gas outlet line for the outlet of reduction gas from the reduction assembly. According to a further embodiment of the plant, the purification device can be connected by means of an export gas line to the $CO_2$ separation device, a compressor and/or at least one cooler being arranged in the export gas line. According to a further embodiment of the plant, a heating device for the heating of product gas before the introduction of the latter into the reduction assembly and/or into the smelting assembly can be provided, the heating device being capable of being heated as a result of the at least partial combustion of tail gas and/or of export gas.

BRIEF DESCRIPTION OF THE DRAWINGS

The invention is explained in more detail below, by way of example and unrestrictively, with reference to FIGS. 1 and 2.

DETAILED DESCRIPTION

Figure 1:
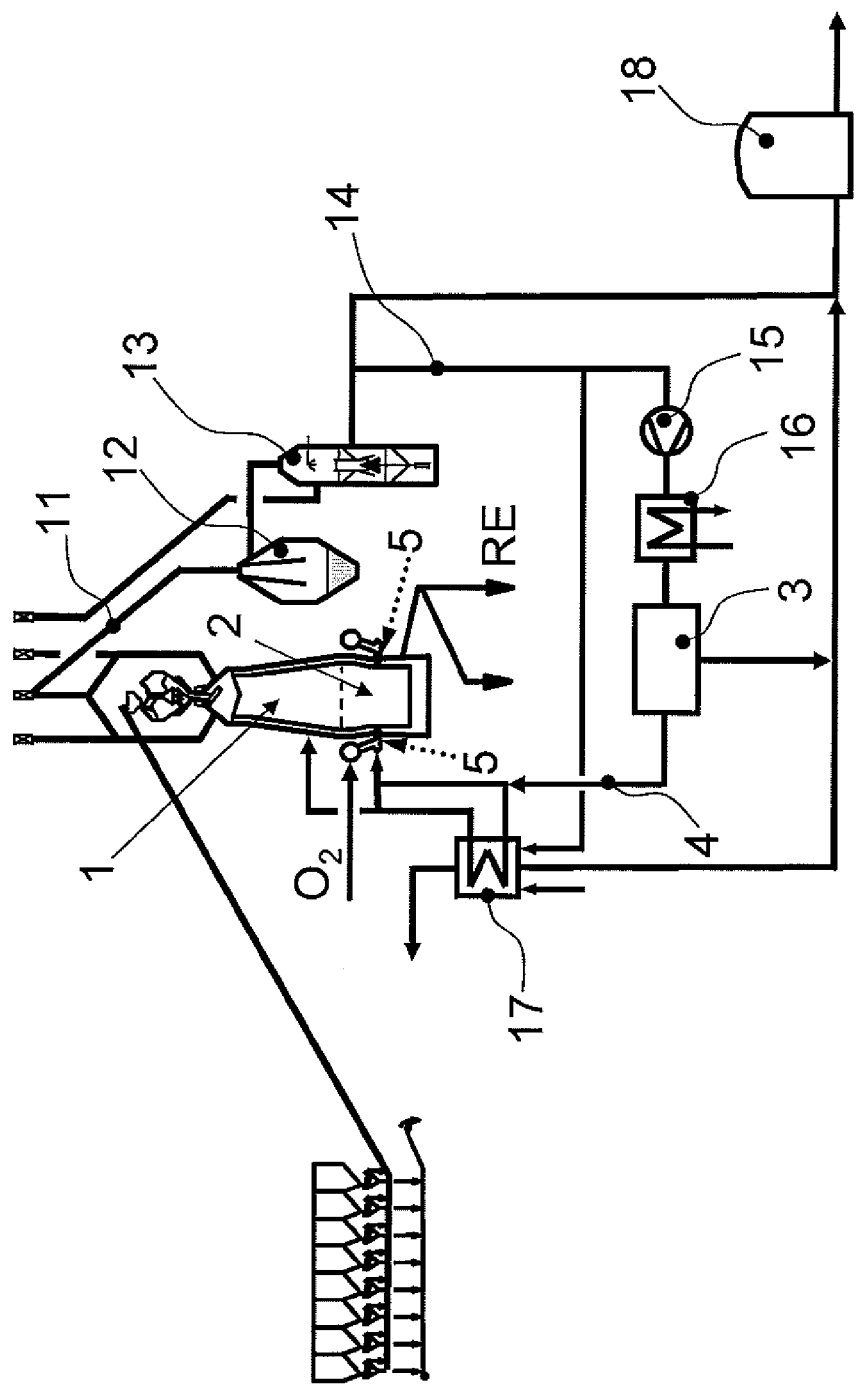
FIG. 1 shows a plant according to various embodiments with a blast furnace.

By virtue of the method according to various embodiments, at least part of the export gas, after a separation of $CO_2$, is utilized for the introduction of pulverulent carbon carriers into the smelting zone. Consequently, the quantity of reduction gas which is drawn off as top gas from the reduction assembly and, after purification, is present as export gas can be reduced or the fraction of export gas which is utilized in the method can be increased. The quantity of export gas which is used in the method as circulation gas, that is to say is delivered anew to the method, can likewise be reduced, since, instead of a propellant gas, such as, for example, nitrogen, customary in conventional methods, a process-specific gas is employed, with the result that the circulated gas quantity is reduced. Consequently, the energy (for example, power for compression) required for conveying the export gas in the method can be reduced, since substantially fewer inert gas constituents are present in the process gases and therefore there is a substantially lower energy demand for the compression, heating and cooling of the process gases. The fraction of export gas which cannot be utilized in the process likewise diminishes and, moreover, considerable quantities of injector gas can be saved, and therefore the operating costs of a plant for pig iron production can be reduced. A further advantage is that the reduction gas or circulation gas is not contaminated by the propellant gas and therefore the reduction potential is also not reduced. Furthermore, by reduction gas, from which $CO_2$ is to be separated, being introduced as propellant gas, the initial introduction of energy via the oxygen nozzles or tuyeres can be increased, with the result that reduction agents in the form of coke or coal can be saved.

According to an embodiment of the method, the product gas is combined in at least one mixing chamber with the pulverulent carbon carriers, if appropriate together with a conveying gas, and is then introduced into the smelting zone. The product gas leads to a considerable rise in the flow velocity at which the pulverulent carbon carriers are introduced into the smelting zone. The pulverulent carbon carriers can be introduced into the mixing chamber by means of a conveying gas. By the product gas being supplied, the pulverulent carbon carriers are accelerated and are introduced into the smelting zone at higher velocity. Due to this rise in the injection velocity, for example, blockages caused by slag or damage caused by pig iron injectors can be avoided. Introduction to the smelting zone can be controlled in a directed manner or adapted to the operating parameters via the pressure and product gas quantity or via the conveying gas quantity.

According to an embodiment of the method, the introduction of the product gas and of the pulverulent carbon carriers, if appropriate together with a conveying gas, into the smelting zone takes place together with an oxygen-rich gas. The pulverulent carbon carriers are used as energy carriers and for the formation of reduction gas. For this purpose, it is advantageous to add oxygen-rich gas immediately during introduction, in order thereby to allow combustion and therefore an introduction of energy. It is advantageous, for example, to provide the hot blast air or oxygen-enriched hot blast air required in the smelting zone as oxygen-rich gas and to introduce it together with the pulverulent carbon carrier and, if appropriate, with a conveying gas into the smelting zone.

According to a further embodiment of the method, the product gas, the pulverulent carbon carriers, if appropriate the conveying gas, and the oxygen-rich gas are injected together first into a tuyere or into an oxygen nozzle and then into the smelting zone. Tuyeres are devices which are customary in blast furnaces and via which the hot, in particular oxygen-rich gas can be introduced into the smelting zone. Oxygen nozzles are devices which are found in smelt-reduction plants and which introduce oxygen-containing gas having high $O_2$ contents, preferably above 90% $O_2$, into the smelting zone of a smelting assembly, such as, for example, a melt-down gasifier. These are mostly arranged annularly around the smelting zone, so that a uniform introduction of the gas is achieved. Advantageously, the abovementioned gases and the pulverulent carbon carriers can be injected together into the smelting zone, an intimate intermixing of the gases with the pulverulent carbon carriers taking place.

According to a further embodiment of the method, the export gas is compressed and/or cooled before treatment in the $CO_2$ separation device. By virtue of these measures, on the one hand, the operating parameters advantageous for $CO_2$ separation can be set and, on the other hand, the pressure and temperature of the product gas can be influenced.

According to yet a further of the method, the $CO_2$-rich gas separated in the $CO_2$ separation device is discharged as tail gas and is intermediately stored, in particular together with export gas from the reduction zone. The tail gas has a mostly highly fluctuating composition, and therefore its calorific value, too, is not constant. Due to intermediate storage, the properties of the tail gas can be compensated. By excess export gas, which is not used as product gas, being admixed, export gas can first be stored together with tail gas and subsequently be made available for external uses, such as, for example, for thermal utilization.

According to an embodiment of the method, the $CO_2$-rich gas separated in the $CO_2$ separation device, as tail gas, and/or export gas from the reduction zone are/is at least partially burnt in a heating device for the purpose of heating the product gas. As a result of combustion, the energy content of the tail gas and/or of the export gas can be utilized, and therefore a cost-effective heating of the export gas can be achieved. The exhaust occurring during combustion is discharged and, if appropriate, subjected to purification. According to a further embodiment of the method, the heated product gas is introduced into the reduction zone and/or the smelting zone. The fraction of export gas which remains in the method and can be reused as circulation gas in the reduction zone and in the smelting zone or as product gas in the smelting zone can therefore be markedly increased.

According to an embodiment of the method, the reduction gas drawn off from the reduction zone is subjected to a dry dedusting and/or wet purification. Since the drawn-off reduction gas has a considerable fraction of dust load or fine solid particles, it is advantageous first to provide purification, in which case dry or wet purification treatments, but also combinations of these, are possible. The purified drawn-off reduction gas may be used according to various embodiments as export gas or delivered for further applications, such as, for example, for thermal utilization.

The plant according to various embodiments for the production of pig iron or liquid steel semi-finished products comprises a reduction assembly, in which metal oxide-containing, in particular iron oxide-containing, batch materials and, if appropriate, aggregates can be at least partially reduced by means of a reduction gas, and a smelting assembly, into which the at least partially reduced batch materials or the aggregates can be introduced and smelted along with the supply of carbon carriers, in particular coke and/or coal, and oxygen-containing gas and along with the formation of the reduction gas. The reduction gas formed in the smelting assembly can be supplied to the reduction zone, reacted there and drawn off, if appropriate after purification, as export gas. The plant comprises, further, a $CO_2$ separation device for separating $CO_2$ from the export gas and for forming a product gas. The $CO_2$ separation device is connected via a product gas line to at least one introduction device for the introduction, in particular injection, of pulverulent carbon carriers into the smelting assembly. By means of the $CO_2$ separation device, $CO_2$ and preferably also residual water vapor ($H_2O$), which are disadvantageous for the smelting process or the generation of reduction gas taking place during this and for the reduction in the reduction zone, can be separated, so that a high-grade product gas with a high fraction of reducing components, such as carbon monoxide (CO) and hydrogen ($H_2$), is set. Pulverulent carbon carriers occur in large quantity in a multiplicity of metallurgical methods, such as, for example, also in the handling of lumpy coals.

The possibility of processing carbon carriers of this type is therefore a substantial economic benefit. Likewise, due to the renewed utilization of the reduction gas drawn off from the reduction assembly, the overall efficiency of the pig iron production method can be improved, so that, for example, the entire quantity of carbon carriers per tonne of produced pig iron can be reduced. By the product gas being utilized for introducing pulverulent carbon carriers into the smelting assembly, it is possible to manage without the otherwise customary injection gas, such as, for example, nitrogen, liquid gas or natural gas. Consequently, on account of the lower inert gas fraction, the quantity of process gas is reduced overall, so that even smaller plants for gas treatment or gas conduction become possible.

According to an embodiment of the apparatus, the introduction device has a mixing chamber for mixing the product gas with pulverulent carbon carriers and, if appropriate, conveying gas, the mixing chamber being connected to the product gas line and to a conveying line for the inward conveyance of the pulverulent carbon carriers. First, the pulverulent carbon carriers are introduced into the mixing chamber, and this may take place, for example, by means of a conveying gas or else due to gravity via the conveying line. By the product gas being added via the product gas line, the injection velocity and injection energy necessary for introduction are applied, so that the pulverulent carbon carriers can be introduced into the smelting assembly. The mixing chamber results in an intimate mixing between the product gas and the pulverulent carbon carriers, so that a uniform introduction becomes possible.

In one possible variant of the apparatus, the introduction device has an introduction line which connects the mixing chamber to at lest one nozzle. By means of the nozzle, a considerable rise in the flow velocity is obtained, so that even injection into a space with high pressure, such as is the case in conventional smelting assemblies, is possible. Moreover, the intimate intermingling of the pulverulent carbon carriers is further increased, so that a highly homogeneous distribution in the smelting assembly becomes possible. By a plurality of mixing chambers and/or a plurality of nozzles being provided, a uniform distribution of the pulverulent carbon carriers in the smelting assembly can be ensured.

According to an embodiment of the apparatus, the introduction device has a supply line for the introduction of oxygen-containing gas. The pulverulent carbon carriers can be introduced together with the oxygen-containing gas, an immediate combustion of the pulverulent carbon carriers and of the product gas or a gasification of the pulverulent carbon carriers upon entry into the smelting assembly being achieved.

According to a further embodiment of the apparatus, the supply line and the introduction line are merged in the nozzle. The nozzle consequently forms a virtually homogeneous nozzle jet which enters the smelting assembly. It is therefore not necessary to provide separate devices for introducing the oxygen-containing gas and for the pulverulent carbon carriers. These can be combined. For the introduction of the pulverulent carbon carriers, therefore, those can be utilized which are already provided in any case for introducing the oxygen-containing gas.

According to an embodiment of the apparatus, the nozzle is a tuyere of a blast furnace or an oxygen nozzle of a smelting assembly. Tuyeres serve for the introduction of mostly hot blast air into the smelting assembly. Oxygen nozzles are devices which are found in smelt-reduction plants and which introduce oxygen-containing gas having high $O_2$ contents, preferably above 90% $O_2$, into the smelting zone of a smelting assembly. For this purpose, mostly annular devices are provided, in order to allow as uniform an introduction of the hot blast air as possible. Instead of hot air, however, it is also possible to inject oxygen-rich gas, for example having an oxygen content >90%, into the smelting assembly. The oxygen-rich gas and the pulverulent carbon carriers can consequently be injected together into the smelting assembly. This refinement ensures an especially effective reaction of the pulverulent carbon carriers, so that these can be utilized especially effectively as energy carriers and for the formation of reduction gas.

According to an embodiment of the apparatus, the reduction assembly is designed as the shaft of a blast furnace or as a reduction shaft or as a fluidized bed assembly or as a group of series-connected fluidized bed assemblies and the smelting assembly is designed as the lower part of a blast furnace or as a melt-down gasifier. Consequently, a very broad group of metal oxide-containing or iron oxide-containing batch materials and aggregates can be processed, while the reduction assembly can be adapted, for example, to the grain size and composition of the metal oxide-containing or iron oxide-containing batch materials or to the type of lumpy carbon carriers. Likewise, by the selection of the smelting assembly, the plant and method can be coordinated accurately with the metal oxide-containing or iron oxide-containing batch materials to be processed.

In one possible variant of the apparatus, a purification device, in particular dry purification and/or wet purification, is provided in a top gas outlet line for the outlet of reduction gas from the reduction assembly. By means of the purification device, the dust load and, for example, fine solid particles discharged with the reduction gas from the reduction assembly are separated. In addition to dry purification, such as, for example, a dust bag, hot gas cyclone, fabric filter or hot gas filter, wet purification, such as, for example, an annular gap scrubber or a Venturi scrubber, may also be provided. Further, a combination of the above purification plants is also possible. The purified reduction gas drawn off the reduction assembly may be utilized according to various embodiments as export gas or be delivered for further applications or utilizations.

According to an embodiment of the apparatus, the purification device is connected by means of an export gas line to the $CO_2$ separation device, a compressor and/or at least one cooler being arranged in the export gas line. The export gas is first compressed and then cooled, a substantial fraction of water vapor ($H_2O$) also being condensed and separated, so that optimal conditions for $CO_2$ separation can be set.

According to an embodiment of the apparatus, a heating device for the heating product gas before the introduction of the latter into the reduction assembly and/or into the smelting assembly is provided, the heating device being capable of being heated as a result of the at least partial combustion of tail gas and/or of export gas. Consequently, the product gas, which is to be introduced into the smelting assembly and/or into the reduction assembly can be thermally adapted correspondingly. As a result of the combustion of tail gas or of export gas in the heating device, the product gas can be heated particularly cost-effectively. The heated product gas can be introduced via lines which connect the heating device to the smelting assembly and to the reduction assembly. Introduction to the smelting assembly may also take place via the introduction device according to various embodiments.

FIG. 1 shows the plant according to various embodiments with a blast furnace for the production of pig iron RE. The lower part of the blast furnace forms a smelting assembly 2 with a smelting zone, and the shaft of the blast furnace forms a reduction assembly 1 with a reduction zone. The reduction gas drawn off from the reduction assembly 1 has already been reacted in the reduction zone. This means that metal oxide-containing or iron oxide-containing batch materials and, if appropriate, aggregates can be at least partially reduced by means of the reduction gas in the reduction assembly 1, the spent reduction gas being drawn off as top gas. The at least partially reduced metal oxide-containing or iron oxide-containing batch materials are introduced into the smelting zone in which the formation of the reduction gas also takes place.

For a further utilization of top gas, it is initially mostly necessary to provide gas purification. This may advantageously take place in two stages by means of dry purification 12 and by means of following wet purification 13. These purification devices are arranged in the top gas outlet line 11. Wet purification 13 is connected via an export gas line 14 to a $CO_2$ separation device 3. This may be operated, for example, by the pressure swing or vacuum pressure swing adsorption method. Mostly, a compressor 15 and, following this, a cooling device 16, such as, for example a water cooler, are provided in the export gas line 14, so that the temperature of the export gas can be set in a directed manner for the $CO_2$ separation, and a large part of the water vapor contained in the export gas can be condensed and separated. In $CO_2$ separation, a $CO_2$-rich gas, the tail gas, is separated, and a product gas is formed which has high fractions of reducing components, such as, for example, hydrogen and carbon monoxide.

Figure 2:
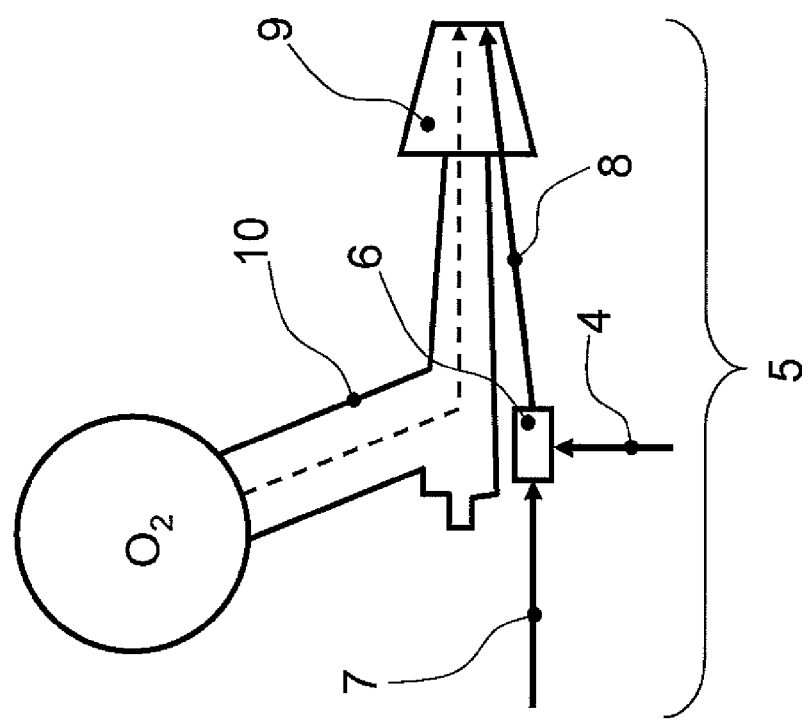
FIG. 2 shows a detail of the introduction device.

FIG. 2 shows the introduction device 5 in detail. The product gas can be introduced into at least one mixing chamber via the product gas line 4. Via a conveying line 7, pulverulent carbon carriers, such as, for example, pulverulent coal, are conveyed into the mixing chamber 6 by means of a conveying gas, such as, for example, nitrogen, and are supplied to a nozzle 9 via an introduction line 8 by means of the product gas. The supply line 10, via which oxygen-rich gas can be introduced, also issues into the nozzle 9. Consequently, the oxygen-rich gas, the conveying gas, the product gas and the pulverulent carbon carriers are introduced or injected together into the smelting assembly. Advantageously, a multiplicity of nozzles may be provided which may be arranged in such a way that they inject directly into the tuyere or oxygen nozzle of a smelting assembly, such as, for example, a blast furnace.

The introduction line 8 may be designed as an injection lance which may also comprise the mixing chamber 6. Further, the introduction line 8 may also be designed as a separate injection duct which issues into the nozzle 9. The nozzle 9 may form a tuyere of a blast furnace or an oxygen nozzle of a smelting assembly, such as, for example, a melt-down gasifier.

Preferably, the supply line 10 and the introduction line 8 are merged at the tip of the injection lance which projects into the tuyere or into the oxygen nozzle or at an injection duct in the tuyere or in the oxygen nozzle. Both configurations utilize the tuyere or the oxygen nozzle which constitute known devices, so that the method according to various embodiments or the apparatus can also be implemented on existing plants.

In addition, a heating device 17 may be provided, in which a heating of at least part of the product gas can take place as a result of an at least partial combustion of tail gas from the $CO_2$ separation device 3 and/or of export gas. This heated part of the product gas can be introduced into the reduction assembly 1 or into the smelting assembly 2.

Excess export gas or else tail gas can be stored in a gas accumulator 18, an equalization of the composition of these gases taking place. This is necessary, since the composition of the tail gas from a pressure swing or vacuum pressure swing adsorption method fluctuates very sharply, thus also resulting in sharp fluctuations in the calorific value. The gas mixture may subsequently be used, for example, for thermal utilization.

LIST OF REFERENCE SYMBOLS

1 Reduction assembly
2 Smelting assembly
3 $CO_2$ separation device
4 Product gas line
5 Introduction device
6 Mixing chamber
7 Conveying line
8 Introduction line
9 Nozzle
10 Supply line
11 Top gas outlet line
12 Dry purification
13 Wet purification
14 Export gas line
15 Compressor
16 Cooling device
17 Heating device
18 Gas accumulator

What is claimed is:

1. A method for the production of pig iron or liquid steel semi-finished products, comprising the steps of:
at least partially reducing metal-containing batch materials in a reduction zone by a reduction gas,
subsequently introducing the reduced metal-containing batch materials into a smelting zone and smelting the reduced metal-containing batch materials along with a supply of lumpy carbon carriers and oxygen-containing gas, while the reduction gas is formed,
wherein the reduction gas formed in the smelting zone is supplied to the reduction zone and reacted there and drawn off as export gas,
delivering at least part of the export gas into a $CO_2$ separation device, which performs a separation of $CO_2$ and formation of a product gas,
utilizing the formed product gas for the introduction, or injection, of pulverulent carbon carriers together with a conveying gas, into the melting zone by:
introducing the pulverulent carbon carriers into a mixing chamber via a conveying gas that is different than the product gas, and
introducing the product gas into the mixing chamber such that the product gas acts as a propellant gas to accelerate the pulverulent carbon carriers into the smelting zone,
wherein the pulverulent carbon carriers are introduced into the smelting zone separately from the reduced metal-containing batch materials, and
controlling the introduction of pulverulent carbon carriers into the smelting chamber by controlling the quantity of the conveying gas supplied to the mixing chamber;
wherein the introduction of the product gas and of the pulverulent carbon carriers, together with the conveying gas, into the smelting zone takes place together with an oxygen-containing gas.

2. The method according to claim 1, wherein the batch materials contain iron-oxide, the lumpy carbon carriers are at least one of coke and coal, and the conveying gas is nitrogen.

3. The method according to claim 1, wherein the product gas, the pulverulent carbon carriers, the conveying gas, and the oxygen-containing gas are injected together first into a tuyere or into an oxygen nozzle and then into the smelting zone.

4. The method according to claim 1, wherein the export gas is compressed before treatment in the $CO_2$ separation device.

5. The method according to claim 1, wherein the $CO_2$-rich gas separated in the $CO_2$ separation device is discharged as tail gas and is intermediately stored or stored together with export gas from the reduction zone.

6. The method according to claim 1, wherein the $CO_2$-rich gas separated in the $CO_2$ separation device, as at least one of tail gas and export gas from the reduction zone is at least partially burnt in a heating device for the purpose of heating the product gas.

7. The method according to claim 6, wherein the heated product gas is introduced into at least one of the reduction zone and the smelting zone.

8. The method according to claim 1, wherein the reduction gas drawn off from the reduction zone is subjected to at least one of a dry dedusting and wet purification.

* * * * *